United States Patent [19]
Jäggi

[11] 3,881,050
[45] Apr. 29, 1975

[54] COUPLING FOR THE GAS-TIGHT CONNECTION OF TWO SPACEDLY ARRANGED TUBULAR-SHAPED CASING SECTIONS OF GAS-BLAST SWITCHING INSTALLATIONS

[75] Inventor: Hans Jäggi, Oberentfelden, Switzerland

[73] Assignee: Sprecher a Schuh AG, Aarau, Switzerland

[22] Filed: July 2, 1974

[21] Appl. No.: 485,315

[30] Foreign Application Priority Data
July 4, 1973 Switzerland.......................... 9740/73

[52] U.S. Cl................ 174/21 R; 174/21 C; 174/92; 174/94 S
[51] Int. Cl............................................. H02g 15/08
[58] Field of Search ..... 174/88 R, 88 S, 94 S, 94 R, 174/84 S, 21 R, 21 C, 21 JS, 22, 92

[56] References Cited
UNITED STATES PATENTS
2,451,413   8/1948   Robinson ..................... 174/21 C X
2,937,229   5/1960   Gard ............................ 174/94 R

*Primary Examiner*—Darrell L. Clay

[57] ABSTRACT

A coupling for the gas-tight connection of two spacedly arranged substantially tubular-shaped casing sections equipped with outer end flanges of gas-blast insulated switching installations, comprising a coupling sleeve consisting of semi-circular cups or half shell elements secured by means of their outer end flanges at the end flanges of the casing sections. Within the coupling sleeve there is provided a substantially tubular-shaped jacket seal equipped with two ring-shaped flange seals formed at its ends and within such jacket seal a support sleeve consisting of semi-circular cups or half shells. Each flange seal of the jacket seal engages between an end flange of the coupling sleeve and the end flange of the associated casing section.

9 Claims, 7 Drawing Figures

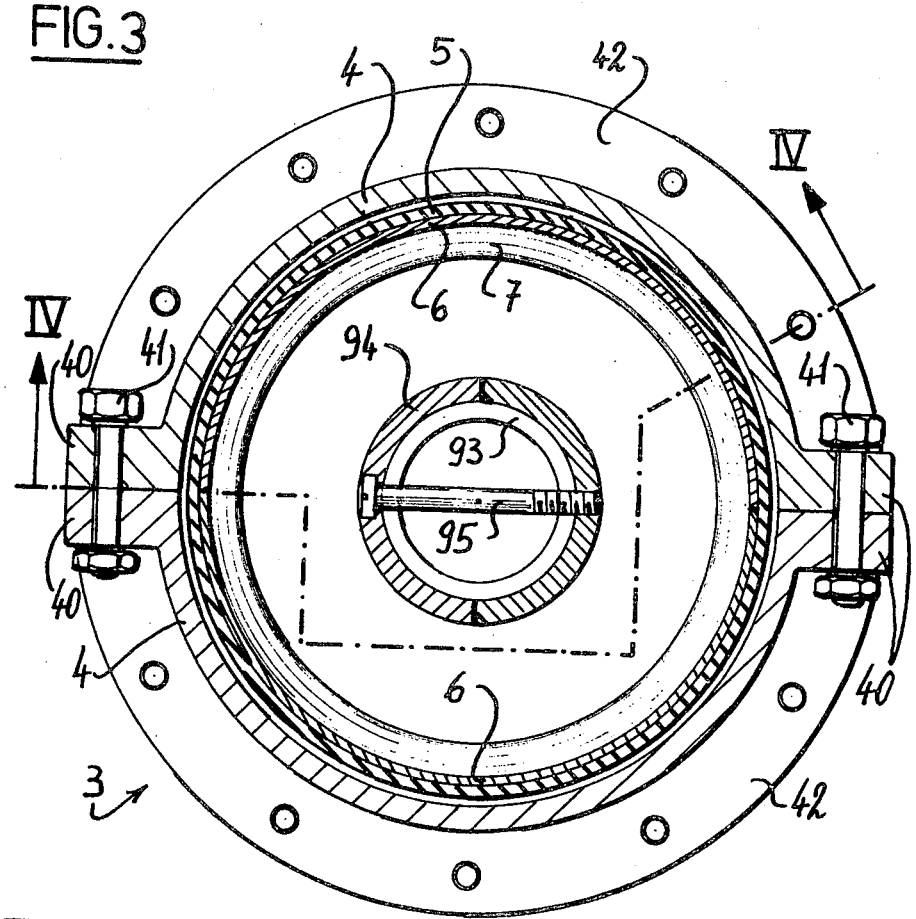
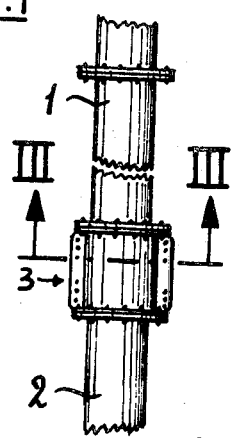
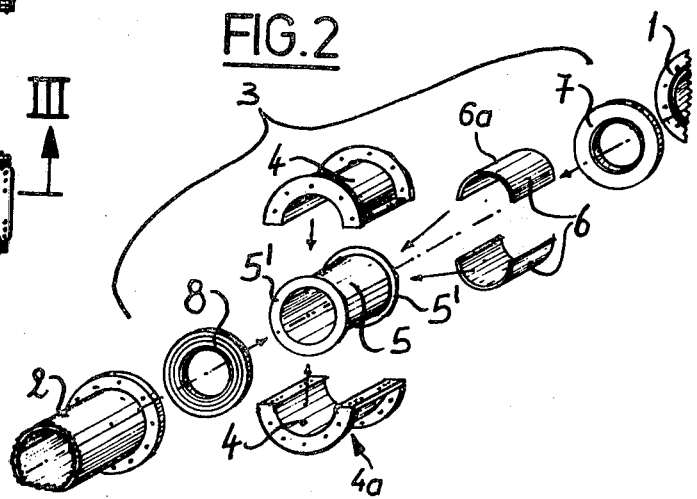

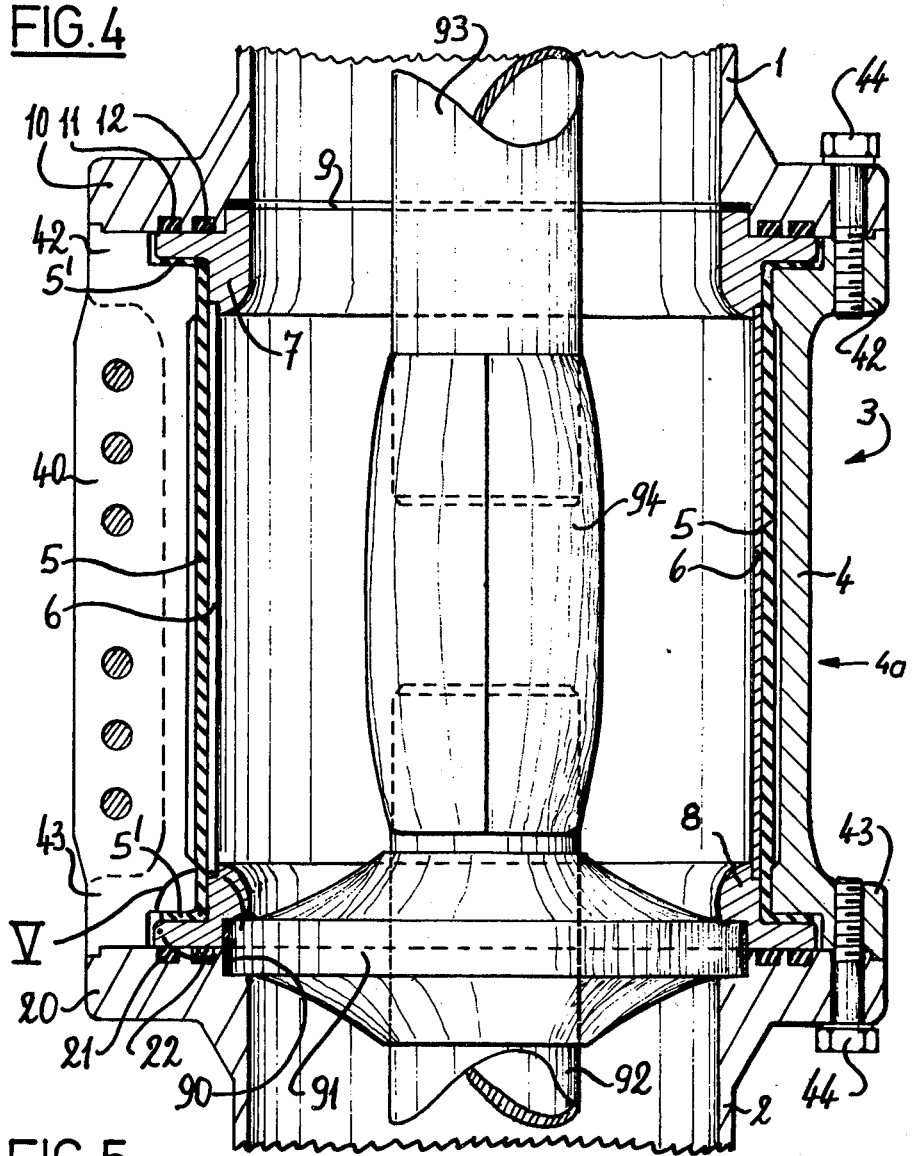
FIG.4
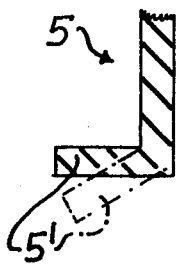
FIG.5
FIG.6

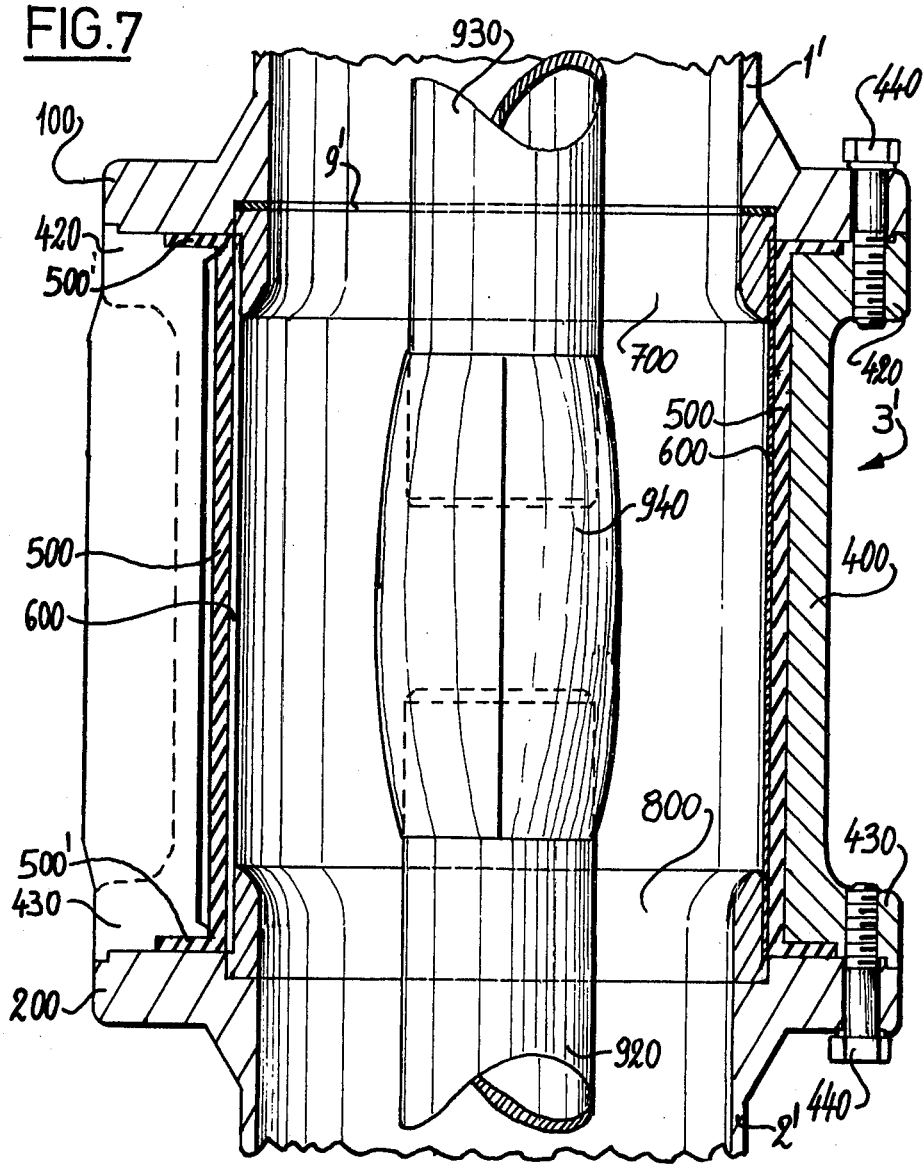

COUPLING FOR THE GAS-TIGHT CONNECTION OF TWO SPACEDLY ARRANGED TUBULAR-SHAPED CASING SECTIONS OF GAS-BLAST SWITCHING INSTALLATIONS

BACKGROUND OF THE INVENTION

The present invention relates to a new and improved construction of coupling arrangement or coupling for the gas-tight connection of two spacedly arranged substantially tubular-shaped casing sections equipped with end flanges, of gas-blast insulated switching installations, comprising a coupling sleeve composed of semicircular cups or half shells, secured by means of their outer end flanges to the end flanges of the casing sections.

Casing sections which directly contact one another, as a general rule, can be coupled with one another so as to be impervious to gas in that their outwardly depending flanges are threadably connected with one another while interposing therebetween an intermediate layer of sealing rings. However, if it is necessary to also produce at such coupling location a connection at the inside of the casing, then there are present considerable difficulties because such only would be possible by axially displacing at least one casing section. Such displacement is however associated with the problem of clamping the components and the spatial requirements. This is also then the case if it is desired to remove a portion of the casing between two casing sections, or if there must be inserted between two casing sections a new section.

In order to provide space for this purpose there were previously proposed different constructions of couplings for the gas-tight connection of two spacedly arranged tubular-shaped casing sections of gas-blast insulating switching installations. In most of these prior art proposals there is provided at least one component which is connected with the ends of the casing section such that during the assembly or disassembly of such component, it must be axially displaced over at least one of the casing sections. This however requires that, for this purpose, there must be available sufficient space which, for instance, cannot be tolerated for instance with arcs, branches or enlargements of compact casings. Additionally, in such cases there are also present critical sealing conditions, oftentimes requiring the use of seals which are not visibly accessible, difficult to assemble and not readily capable of being monitored. These prior art proposals are thus extremely complicated in construction.

It has already been proposed to mount at the end of one casing section such a thin coupling component that it displaceably engages with the interior of the other casing section. In this case the displacement can occur internally of the casing, wherein, however, apart from the critical sealing conditions at the sliding element, there is also present an inwardly directed edge which is unfavorable as concerns the electrical field. Additionally, the displacement location for the gas-blast filled installation is dangerous because it can slide apart under the action of the pressure of the gas.

There has also been proposed a coupling formed of semi-circular cup elements or half shells which are attached by means of outer flanges at the end flanges of the casing sections, the flanges being sealed by sealing rings and the lengthwise joints of the semicircular cup elements by sealing strips. yet what is problematic with this prior art arrangement is the joint between the sealing strips and the sealing rings.

SUMMARY OF THE INVENTION

Hence, it is a primary object of the present invention to provide an improved construction of coupling for the gas-tight connection of two spacedly arranged tubular-shaped casing sections of gas-blast switching installations, which is not associated with the aforementioned drawbacks and limitations of the prior art constructions.

Another and more specific object of the present invention aims at the provision of a new and improved construction of coupling arrangement of the previously mentioned type which is relatively simple in construction and can be fabricated without having to accept the aforementioned drawbacks of the heretofore known couplings.

Still a further object of the invention aims at the provision of a novel coupling arrangement wherein there can be avoided the presence of components which must be axially displaced in or over the casing sections and providing for extremely good sealing conditions.

Now in order to implement these and still further objects of the invention, which will become more readily apparent as the description proceeds, the coupling of this development is manifested by the features that within the coupling sleeve there is provided a substantially tubular-shaped jacket seal provided with two substantially ring-shaped flange seals formed at its two ends, and within such jacket seal there is provided a supporting or support sleeve consisting of substantially semi-circular cups or half shells. Each flange seal of the jacket seal engages between an end flange of the coupling sleeve and the end flange of the associated casing section.

The jacket seal which is arranged in the aforementioned manner, including its flange seals, is capable of simultaneously providing a sealing action both with the ends as well as along the lengthwise joints of the outer coupling sleeve consisting of the semicircular cups or half shells. If its flange seals are directly located between the end flanges of the casing sections and the outer coupling sleeve, then further seals are totally unnecessary.

As a general rule, for the purpose of filling a switching installation with a pressurized gas, typically there being used sulphur hexafluoride, the installation is initially evacuated. Owing to the negative pressure, the jacket seal is sucked inwardly, if it were not prevented from doing so by the support sleeve.

This support sleeve is composed of semicircular cup elements or half shells so that it can be removed from or introduced into the interior of the jacket seal which is preferably rearwardly upset itself.

The support sleeve can be directly supported at the ends of the casing sections which are interconnected by the coupling and electrically conductively connected therewith. Preferably there are however provided two carrier rings which support the support sleeve and which are each supported at an end of one of the casing sections, whereby they are preferably positively connected therewith. Furthermore, in a particularly preferred construction, each carrier ring engages between the end flange of the one casing section and the one flange seal of the jacket seal, whereby between the carrier ring and the end flange of the casing section there is provided at least one sealing ring. In this regard it is advantageous to provide at least two concentric sealing rings, particularly supported in annular or ring-shaped grooves of the aforementioned end flange, the inner sealing ring of which can be designed so as to be resistant to the action of the filled gas and its decomposition products, whereas the outer sealing ring can be designed to be resistant against the environmental media, especially constructed to provide a sealing action in the presence of negative pressures. In order to be able to obtain this separation of functions of the sealing rings also for the jacket seal including its flange seals, such can be advantageously constructed from a number of layers. In this regard the individual layers can be fixedly connected with one another or, however, can be designed as a loose arrangement of a number of jacket seals which are upset over one another.

The connection of the casing sections occurs, as a general rule, through the threadable connection of the end flanges of the casing sections with the end flanges of the coupling sleeve, which in turn are held together by threadably connecting the lengthwise flanges along the half shell joints.

BRIEF DESCRIPTION OF THE DRAWINGS

The invention will be better understood and objects other than those set forth above, will become apparent when consideration is given to the following detailed description thereof. Such description makes reference to the annexed drawings which are not drafted to scale and wherein:

FIG. 1 is a view of a coupling location of a casing tube;

FIG. 2 is an exploded perspective view of the components of the coupling location of FIG. 1;

FIG. 3 is an enlarged sectional view of the showing of FIG. 1 through the coupling location of the arrangement of FIG. 1, taken substantially along the line III—III thereof;

FIG. 4 is a sectional view through the coupling location shown in FIG. 3, taken substantially along the line IV—IV thereof;

FIG. 5 is an enlarged detailed sectional view of a part of the jacket seal, specifically the portion enclosed within the circle V of FIG. 4;

FIG. 6 illustrates a further enlarged fragmentary sectional view of the jacket seal; and FIG. 7 is a variant construction of coupling shown in sectional view similar to the showing of FIG. 4.

DETAILED DESCRIPTION OF THE PREFERRED EMBODIMENTS

Considering now the drawings, it is to be generally understood that in FIGS. 1 to 6 the same reference characters have been generally employed for the same or analogous components. Referring therefore specifically to FIG. 1, there will be recognized both of the sections 1 and 2 of the casing, these casing sections being operatively connected with one another by the coupling 3. This coupling 3, according to the showing of FIG. 2, consists of the half shells or bowl elements 4 of a coupling sleeve 4a, the therein enclosed jacket or shell seal 5 with its flange seals 5', the support sleeve 6 composed of two half shells 6a located in the jacket seal 5 and the support or carrier rings 7 and 8. As best seen by referring to FIG. 3, the half shells 4 of the coupling sleeve 4a are connected with one another by threaded bolts 41 at their lengthwise flanges 40. For the purpose of enabling connection with the end flanges 10 and 20 respectively (FIG. 4) of the casing sections 1 and 2, the coupling sleeve possesses end flanges 42 and 43 which are connected with these end flanges 10 and 20 by means of screws 44 or equivalent devices. By means of the last-mentioned threaded elements or screws 44 there is clamped between the end flanges 10 and 20 the inner coupling component or part composed of the support rings 7 and 8, the support sleeve or cylinder 6 and the jacket or shell seal 5. In order to ensure for a good electrical connection between the components 1, 7, 6, 8 and 2 there is inserted between the flange 10 and the carrier or support ring 7 a resilient ring 9, whereas a sealing- and contact ring 90 is provided between the carrier ring 8 and the flange 20. The sealing- and contact ring 90 simultaneously serves to support an insulating body 91 which centrally holds a conductor section 92 with respect to the casing. It is here assumed that the conductor section 92 within the coupling 3 is connected with the conductor section 93 by means of a split clamp 94 held together by means of the screws 95 or equivalent fastening devices.

In not particularly referenced concentric ring-shaped or annular grooves of the flange 10 there are arranged two sealing rings 11 and 12 for sealing the joint between the flange 10 and the carrier ring 7, and between the carrier ring 7 and the flange 42 of the coupling sleeve 4a the sealing action is provided by the flange seal 5' of the jacket seal 5. In analogous manner there are provided sealing rings 21, 22 in ring-shaped grooves of the flange 20 for sealing the joint with respect to the carrier or support ring 8, whereas the seal of the joint between the carrier ring 8 and the flange 43 of the coupling 4a is accomplished by the other flange seal 5' of the jacket seal 5. It should be therefore apparent that with this construction there cannot occur any sealing problems.

As best seen by referring to FIG. 5, the flange seal 5' of the jacket seal 5 need not be arranged perpendicular to the jacket portion rather can be also inclined, whereby instead of the sharp transition loctions there can be of course also provided rounded transition locations. As a general rule, the shape of the jacket seal together with its flange seals is accommodated to the remaining components.

FIG. 6 illustrates that the jacket seal 5 can be composed of two layers 50 and 51 which contact one another, one of which, corresponding to the sealing ring 12, is resistant against the effects of the filling medium of the casing and the other of which, corresponding to the sealing ring 11, is resistant against the ambient or surrounding media of the casing.

If for any reason it is desired to dismantle coupling 3, then it is possible to loosen the screws 41 and 44 and to remove the half shells or cup elements 4 of the coupling sleeve. It is now possible to upset rearwardly with regard to itself the jacket sleeve 5 and to remove therefrom both of the half shells 6a of the support sleeve 6, with the result that the connection location of the conductor arrangement 92, 93 formed by the clamp 94, is accessible and detachable. As soon as also this connection of the conductor arrangement has been disconnected it is readily possible to remove the corresponding components. By carrying out the reverse sequence of operations, it is possible to again reassemble the coupling. In the present case the carrier or supports rings 7 and 8 are not removed, something which is only then carried out if there is required a more extensive disassembly. It should be, however, apparent that after loosening the connection 94 the conductor 92, 93 also together with the carrier rings 7 and 8 and the jacket seal 5 can be easily removed.

Similar conditions prevail for the coupling arrangement 3' of FIG. 7 which only essentially differs from the coupling arrangement depicted in FIG. 3 by the different construction of its support rings 700 and 800.

In FIG. 7 there will be seen that the end flanges 100 and 200 of the casing sections 1' and 2' respectively are constructed to be smooth or flat and such are threadably interconnected by means of screws 440 with the end flanges 420 and 430 of the coupling sleeve 400 such that between the threaded together flanges there is clamped a respective flange seal 500' of the jacket seal 500. In this case there is also not required any further seals other than the jacket or shell seal 500 with its flange seals 500'. The jacket seal 500 bears against the support sleeve 600 which is retained by the carrier rings 700 and 800 inserted into the ends of the casing sections 1' and 2' respectively, the spring 9' insuring that the components 700, 600 and 800 produce a faultless electrical conductive connection between the casing sections 1' and 2'.

Now in the embodiment of FIG. 7, the conductor ends of the conductors 930 and 920 are connected by clamp 940 at the region of the coupling 3', and in this case there is not provided any centering ring.

Preferably, with the exception of the seals, all of the components are formed of electrically conductive material, and it would appear to be even permissible to use electrically conductive seals. However, it is preferable to employ for all of the seals rubber or elastomeric materials.

While there is shown and described present preferred embodiments of the invention, it is to be distinctly understood that the invention is not limited thereto, but may be otherwise variously embodied and practiced within the scope of the following claims. Accordingly,

What is claimed is:

1. A coupling arrangement for the gas-tight connection of two spacedly arranged substantially tubular-shaped casing sections of gas-blast insulated switching installations, the casing sections being provided with outer end flanges, comprising a coupling sleeve having outer end flanges and composed of substantially half shells, said coupling sleeve being secured by means of its outer end flanges to the end flanges of the casing sections, a substantially tubular-shaped jacket seal arranged within the coupling sleeve, said jacket seal having two substantially ring-shaped flange seals formed at its two ends, a support sleeve arranged within the jacket sleeve, said support sleeve comprising half shells, and wherein each flange seal of the jacket seal engages between an end flange of the coupling sleeve and the end flange of the one associated casing section.

2. The coupling arrangement as defined in claim 1, further including two carrier rings providing the support for the support sleeve, each of the carrier rings being supported at an end of one of the associated casing sections.

3. The coupling arrangement as defined in claim 2, wherein each carrier ring is positively connected at the end of one of the associated casing sections.

4. The coupling arrangement as defined in claim 2, wherein each carrier ring is engaged between the end flange of the one associated casing section and the associated flange seal of the jacket seal.

5. The coupling arrangement as defined in claim 4, further including at least one sealing ring between each carrier ring and the end flange of the associated casing section.

6. The coupling arrangement as defined in claim 5, including a number of concentrically arranged sealing rings between each carrier ring and the end flange of the associated casing section, and wherein the jacket seal including its flange seals is of a multi-layer structure.

7. The coupling arrangement as defined in claim 6, wherein said plurality of concentrically arranged sealing rings are disposed in substantially ring-shaped grooves in the associated end flange.

8. the coupling arrangement as defined in claim 2, including means electrically conductively connecting the support sleeve with the casing sections for electrically screening the jacket seal.

9. The coupling arrangement as defined in claim 8, wherein said electrically conducting-connecting means include said carrier rings.

* * * * *